United States Patent
Wiencke et al.

(10) Patent No.: US 9,645,825 B2
(45) Date of Patent: May 9, 2017

(54) INSTRUCTION CACHE WITH ACCESS LOCKING

(71) Applicant: TEXAS INSTRUMENTS DEUTSCHLAND GMBH, Freising (DE)

(72) Inventors: Christian Wiencke, Garching (DE); Max Gröning, Freising (DE); Norbert Reichel, Wartenberg (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 100 days.

(21) Appl. No.: 14/597,560

(22) Filed: Jan. 15, 2015

(65) Prior Publication Data

US 2016/0210246 A1 Jul. 21, 2016

(51) Int. Cl.
*G06F 12/00* (2006.01)
*G06F 9/38* (2006.01)
*G06F 12/0875* (2016.01)
*G06F 9/30* (2006.01)
*G06F 12/14* (2006.01)

(52) U.S. Cl.
CPC .......... *G06F 9/381* (2013.01); *G06F 9/30047* (2013.01); *G06F 12/0875* (2013.01); *G06F 12/1433* (2013.01); *G06F 2212/1052* (2013.01); *G06F 2212/452* (2013.01)

(58) Field of Classification Search
CPC ............. G06F 12/0875; G06F 12/1433; G06F 2212/452; G06F 9/30047; G06F 9/381
USPC .......................................... 711/104, 118, 121
See application file for complete search history.

(56) References Cited

U.S. PATENT DOCUMENTS

| | | | | |
|---|---|---|---|---|
| 7,080,213 B2 * | 7/2006 | Grenholm | ........... | G06F 12/0815 709/216 |
| 7,392,346 B2 * | 6/2008 | Mandler | ............. | G06F 13/1668 711/121 |
| 8,180,964 B1 * | 5/2012 | Koh | ..................... | G06F 11/3442 711/118 |
| 8,291,174 B2 * | 10/2012 | Resnick | .............. | G06F 12/0844 711/104 |
| 8,706,964 B1 * | 4/2014 | Koh | ..................... | G06F 12/0888 711/118 |
| 8,949,532 B1 * | 2/2015 | Koh | ............................. | 711/118 |
| 9,250,914 B2 * | 2/2016 | Hughes | ................. | G06F 9/3806 |

* cited by examiner

*Primary Examiner* — Mardochee Chery
(74) *Attorney, Agent, or Firm* — John R. Pessetto; Charles A. Brill; Frank D. Cimino

(57) ABSTRACT

An instruction cache includes instruction storage, a plurality of lock indicators, and control logic. The instruction storage includes a plurality of cache blocks to store instructions. Each of the lock indicators is associated with one of the cache blocks so as to control access to the associated cache block. The control logic is configured to: set to a write disable state, on access of a given one of the cache blocks, a given one of the lock indictors associated with the given one of the cache blocks; to determine whether a given instruction is stored in the instruction storage; and to deny write access to the given one of the cache blocks that is assigned to store the given instruction based on the given one of the block indicators being set to the write disable state.

20 Claims, 3 Drawing Sheets

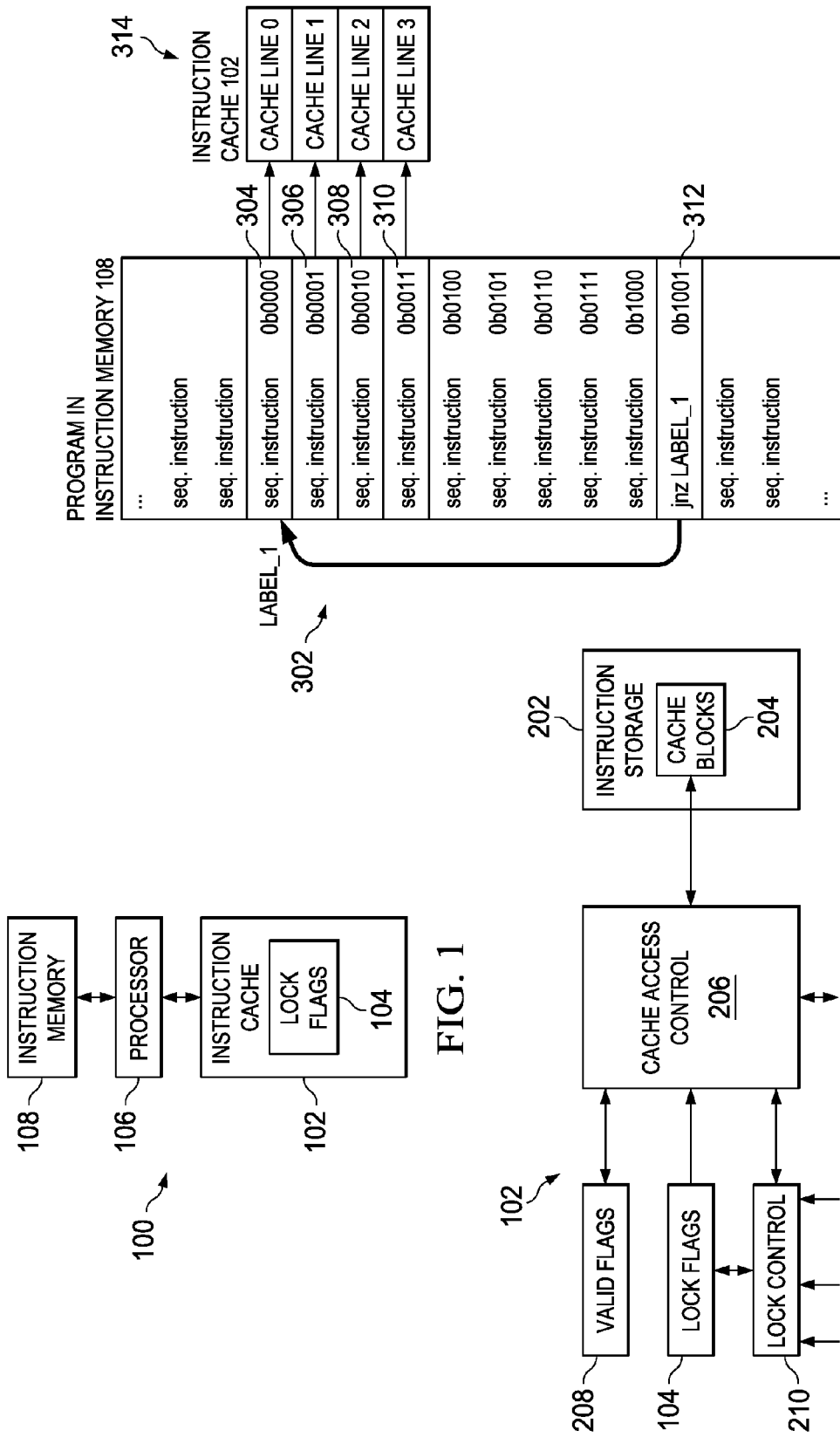

INSTRUCTION CACHE WITH ACCESS LOCKING

BACKGROUND

Memory access speed is a significant factor in overall processor/computer performance. Generally, faster memory accesses result in higher performance. Unfortunately, the cost of high-speed memory often makes it impractical to construct a computer system using only high-speed memory. In an attempt to provide improved memory access rates, many computers employ a memory system that includes a hierarchy of memory levels. A hierarchical memory system may include a main memory and one or more caches. The main memory may be relatively large and inexpensive and include low-speed memory, such as dynamic random access memory (RAM), or the like. The caches are smaller storage arrays that include higher speed memory. The caches are disposed between the main memory and computer processor, and may be included on a die along with the processor.

The caches temporarily store recently accessed information (instruction or data). Caches are effective because information that has been accessed recently is likely to be accessed in the near future. As a program executes, the instructions or data recently accessed by the program are stored in the cache to provide quick future access.

SUMMARY

Systems and methods for improving the effectiveness of instruction caching are disclosed herein. In one embodiment, a processor includes a fetch unit and an instruction cache. The fetch unit is configured to fetch instructions for execution. The instruction cache is configured to store instructions for execution. The instruction cache includes instruction storage, a plurality of lock indicators, and control logic. The instruction storage includes a plurality of cache blocks to store the instructions. Each of the lock indicators is assigned to control access to one of the cache blocks. The control logic is configured to, on access of a given one of the cache blocks, set to a write disable state a given one of the lock indicators assigned to control access to the given one of the cache blocks. The control logic is also configured to, on determination that a given instruction fetched by the fetch unit is not stored in the instruction storage, deny write access to the given one of the cache blocks based on the given one of the lock indicators being set to the write disable state. The given one of the cache blocks is associated with the given instruction.

In another embodiment, an instruction cache includes instruction storage, a plurality of lock indicators, and control logic. The instruction storage includes a plurality of cache blocks to store instructions. Each of the lock indicators is associated with one of the cache blocks so as to control access to the associated cache block. The control logic is configured to: set to a write disable state, on access of a given one of the cache blocks, a given one of the lock indictors associated with the given one of the cache blocks; to determine whether a given instruction is stored in the instruction storage; and to deny write access to the given one of the cache blocks that is assigned to store the given instruction based on the given one of the lock indicators being set to the write disable state.

In a further embodiment, a method includes fetching, by a fetch unit, instructions for execution. The fetched instructions are stored in cache blocks of an instruction cache. Access to the cache blocks is controlled via lock indicators. Each of the lock indicators controls access to one of the cache blocks. On access of a given one of the cache blocks, a given one of the lock indictors associated with the given one of the cache blocks is set to a write disable state. Whether a given instruction is stored in the instruction cache is determined. Write access to the given one of the cache blocks that is assigned to store the given instruction is denied based on the given one of the lock indicators being set to the write disable state.

BRIEF DESCRIPTION OF THE DRAWINGS

For a detailed description of exemplary embodiments of the invention, reference will now be made to the accompanying drawings in which:

FIG. 1 shows a block diagram of a system including an instruction cache with loop locking in accordance with various embodiments;

FIG. 2 shows a block diagram of an instruction cache with loop locking in accordance with various embodiments;

FIGS. 3-4 illustrate operation of an instruction cache with loop locking in accordance with various embodiments.

NOTATION AND NOMENCLATURE

Figure 4:
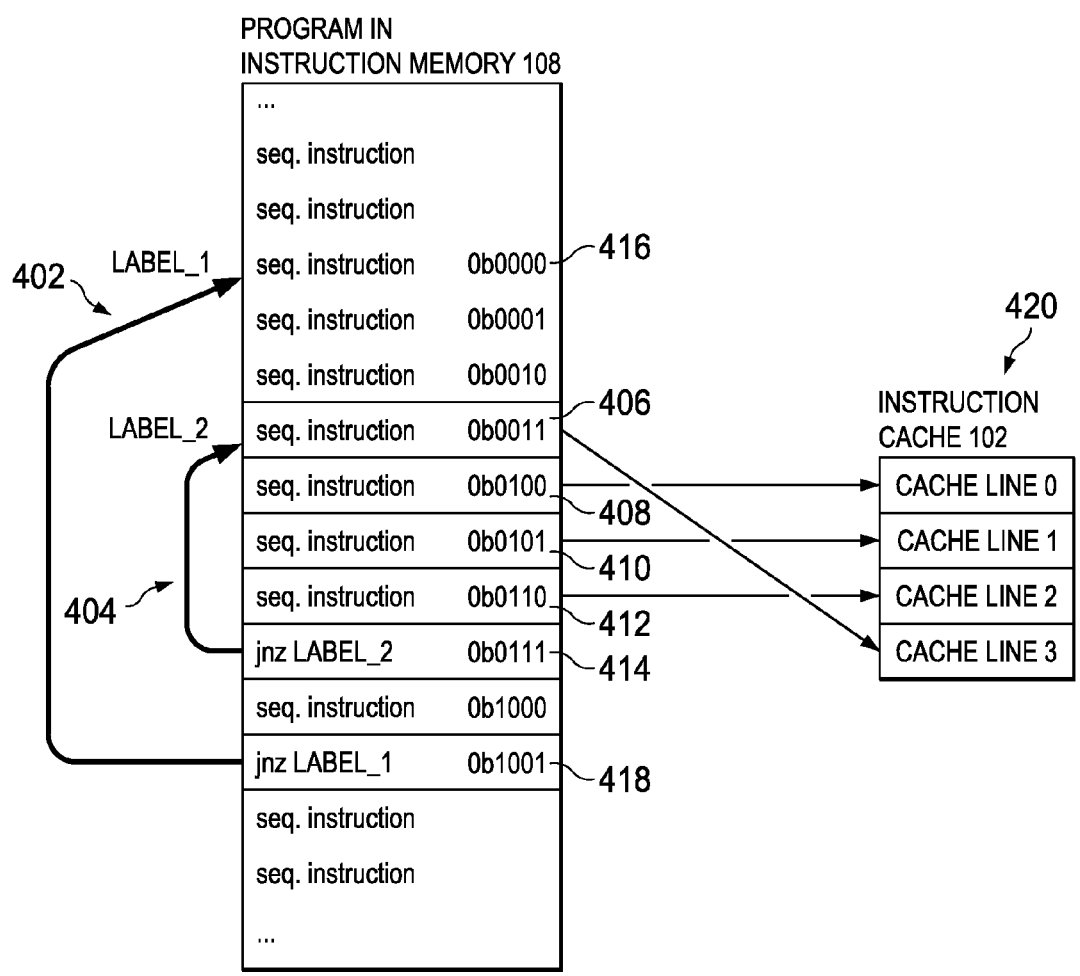

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Because a cache may be relatively small, storing instructions or data retrieved from a slower main memory in the cache may result in some repetitive loading/unloading processes such as flushing instructions or data currently stored in the cache to make room for different data or instructions. If the cache hit rate (how often instructions or data can be read from the cache) is very low then such repetitive replacement of cache contents is sometimes referred to as "cache thrashing."

In some systems, cache thrashing may consume more energy than would be consumed by execution of the program without the cache. For example, with a conventional cache, execution of an instruction loop that includes more instructions than can be concurrently stored in the cache (e.g., two or more times as many instructions as the cache can store) can result in a situation in which the next loop instruction to be executed is never stored in the cache and the cache is continually reloaded. Under such conditions, the cache provides no performance enhancement (cache hit rate is 0%) and increases energy consumption. Devices that include relatively small caches are especially susceptible to thrashing during loop execution.

Embodiments of the present disclosure include an instruction cache that improves execution performance when executing instruction loops that exceed cache storage capacity while reducing overall energy consumption. The instruction cache disclosed herein includes locking that may enable cache writes for storage of an initial set of loop instructions and inhibit cache writes for other instruction sequences. Thus, embodiments of the instruction cache can accelerate loop execution, and reduce or eliminate thrashing and excess energy consumption associated with execution of instruction loops that exceed the size of the cache.

FIG. 1 shows a block diagram of a system 100 that includes instruction caching with loop locking in accordance with various embodiments. The system 100 includes a processor 106, an instruction cache 102, and an instruction memory 108. The processor 106 may include a central processing unit (CPU), a microcontroller, a general purpose microprocessor, or other instruction execution device. In some embodiments, the processor 106 and instruction cache 102 may be formed on a single integrated circuit. Also, in some embodiments, the instruction cache 102 can be integrated in the processor 106.

The instruction memory 108 is a storage device, such as a random access memory (volatile or non-volatile) that stores instructions to be executed by the system 100. In embodiments in which the processor 106 and instruction cache 102 are integrated on a single die, the instruction memory 108 may be external to the die, or integrated on the die.

The processor 106 is coupled to the instruction memory 108. The processor 106 retrieves instructions from the instruction memory 108 for execution. The processor 106 may include address generation circuitry to provide addresses for accessing the instruction memory 108, instruction prefetch logic, and/or other circuitry to facilitate efficient retrieval of instructions.

The processor 106 examines the instructions received from the fetch unit 106, and translates each instruction into controls suitable for operating execution units, registers, and other components of the processor 106 to perform operations that effectuate the instructions.

The execution units included in the processor 106 may include arithmetic circuitry, shifters, multipliers, registers, logical operation circuitry, or other data manipulation circuits that are arranged to manipulate data values as specified by the control signals generated by the processor 106. Some embodiments of the processor 106 may include multiple execution units that include the same or different data manipulation capabilities.

The system 100 may include various other components that have omitted from FIG. 1 in the interest of clarity. For example, embodiments of the system 100 may include registers, additional memory, communication devices, interrupt controllers, timers, clock circuitry, direct memory access controllers, and various other components and peripherals.

The instruction cache 102 is coupled to the processor 106. The instruction cache 102 provides local high-speed storage for instructions retrieved from the instruction memory 108. The instruction cache 102 may be a direct mapped cache, a set associative cache, or other type of cache. Instructions stored in the instruction cache 102 may be provided to the processor 106 directly from the instruction cache 102, rather than retrieved from the instruction memory 108.

The instruction cache 102 includes lock flags 104. The instruction cache 102 applies the lock flags to limit writing to the instruction cache 102. Because in many applications, instruction loops contain the instructions most often repeated, and accordingly, the instructions for which the instruction cache 102 may be most advantageously applied, some embodiments of the instruction cache 102 may apply the lock flags to allow only instructions of an instruction loop to be stored in the instruction cache 102. For example, the processor 106, or other logic of the system 100, may recognize a jump or branch to a lower address as the end of an instruction loop, and responsive to the recognition of the loop branch, the instruction cache 102 may reset the lock flags, where a "reset" lock flag, as used herein, refers to the lock flag being in a state that enables cache writes. As each cache location is written, the instruction cache 102 may set the lock flags, where a "set" lock flag, as used herein, refers to the lock flag being in a state that disables further writes to the location. Thereafter, further iterations of the instruction loop benefit from the instructions stored in the instruction cache 102, while avoiding thrashing and the associated energy waste.

FIG. 2 shows a block diagram of the instruction cache 102 in accordance with various embodiments. The instruction cache 102 includes instruction storage 202, cache access control logic 206, valid flags 208, lock flags 104, and lock control logic 210. The instruction storage 202 includes random access memory that stores instructions fetched from the instruction memory 108. The instruction storage 202 is subdivided into a number of cache blocks (or cache lines) 204 where each cache block 204 stores one or more instructions. In embodiments in which a cache block 204 stores multiple instructions, the instructions stored by the cache block 204 may be retrieved from adjacent addresses of the instruction memory 108. The number of cache blocks 204 provided in the instruction storage 202 may vary in different embodiments of the instruction cache 102. For example, one embodiment of the instruction cache 102 may include 16 cache blocks 204, and a different embodiment may include 32 cache blocks 204.

The cache access control logic 206 manages reading and writing of the cache blocks 204. For example, the fetch unit 106 provides the address of an instruction to the instruction cache 102, and the cache access control logic 206 determines whether the instruction is stored in the instruction storage 202. The cache access control logic 206 applies the valid flags 208 and the lock flags 104 to control reading and writing of the cache blocks 204. The cache access control logic 206 may compare the address to address tags stored in the instruction cache 102 and check the state of the valid flags 208 to determine whether the instruction is stored in the cache 102. If the instruction is stored in the instruction storage 202, then the cache access control logic 206 retrieves the instruction from the instruction storage 202 and provides the instruction to the fetch unit 106. If the cache access control logic 206 determines that the instruction is not stored in the instruction storage 202, then the cache access control logic 206 may store the instruction retrieved from the instruction memory 108 in the instruction storage 202 for subsequent access.

The valid flags 208 indicate whether instructions are stored in the cache blocks 204. Each of the valid flags 208 is uniquely associated with one of the cache blocks 204, and indicates whether an instruction (or instructions) is/are stored in the corresponding cache block 204. If the valid flag 208 associated with a cache block 204 indicates that an instruction is stored in the cache block 204, then the fetch unit 106 may retrieve the instruction from the cache block 204 rather than from the instruction memory 108. The cache access control logic 206 may set a valid flag to indicate storage of an instruction responsive to writing an instruction to the cache block 204 corresponding to the valid flag 208. The cache access control logic 206 may reset a valid flag 208 if the cache block 204 corresponding to the valid flag 208 is cleared or is otherwise not to provide an instruction for execution until rewritten. For example, at initialization of the system 100, the valid flags 208 are reset to indicate that no instructions are stored in the cache blocks 204, and are thereafter set as instructions are retrieved from the instruction memory 108 and stored in the cache blocks 204.

The lock flags 104 indicate whether writing to the cache blocks 204 is permitted. Each of the lock flags 104 is uniquely associated with one of the cache blocks 204, and indicates whether writing to the corresponding cache block 204 is enabled or disabled. An instruction can be written to the cache block 204 corresponding to a lock flag 104 only if the lock flag 104 is reset. For example, if the fetch unit 106 retrieves an instruction not stored in the instruction cache 102 from the instruction memory 108, but the lock flag 104 corresponding to the cache block 204 for the instruction is set, then the retrieved instruction will not be stored in the cache block 204.

The lock control logic 210 manipulates the lock flags 210 to make the instruction cache 102 more effective. More specifically, the lock control logic 210 manages the lock flags 104 to prevent thrashing and improve cache effectiveness, e.g., in some embodiments of the instruction cache 102, when executing instruction loops. When the instruction cache is initialized, the lock control logic 210 may set all the lock flags 104, thereby disabling writing to the cache blocks 204. The lock control logic 210 receives inputs that indicate the lock flags 104 should be reset. In FIG. 2, three such inputs are illustrated—loop, call, and interrupt. Some embodiments of the instruction cache 102 may receive one or more of these inputs. Other embodiments of the instruction cache 102 may receive different inputs that enable writing to the cache blocks 204.

The loop input indicates that a loop branch instruction has been detected in the stream of instructions being executed. Detection of a loop branch instruction may be implemented, for example, in the processor 106 by identifying a branch or jump to a lower address than the address of the branch instruction. Detection of a loop branch instruction, and subsequent receipt of indication of the detection by the lock control logic 210, causes the lock control logic 210 to reset all (or at least some) of the lock flags 104. Beginning at the destination address of the loop branch instruction (i.e., the top of the instruction loop), the instructions retrieved from the instruction memory 108 are written into the cache blocks 204. As each cache block 204 is written, the cache access control logic 206 notifies the lock control logic 210, and the lock control logic 210 sets the lock flag 104 corresponding to the written cache block 204. Thus, the instructions executed starting at the top (i.e., the lowest address) of the instruction loop are cached until all the cache blocks 204 are written. None of the cache blocks 204 storing an instruction of the loop is overwritten by a different instruction of the loop, and thrashing is thereby avoided.

On subsequent iterations of the loop, the lock flags 104 are again reset, based on identification of the loop branch instruction, to allow writing to the cache blocks 204. However, the instructions starting at the top of the loop are already stored in the cache blocks 204 (i.e., the control logic 206 generates cache hits when the instructions are fetched), and the cache access control logic 206 notifies the lock control logic 210 of the cache hits. Responsive to the cache hits, the lock control logic 210 sets the lock flag 104 corresponding to each cache block 204 from which an instruction is read. Thus, instructions at the top of a loop are loaded into the instruction cache 102 once per set of loop iterations, and after being loaded are provided from the cache 102 on each subsequent iteration of the loop.

The call input to the lock control logic 210 indicates that a subroutine call instruction is being executed. Detection of a subroutine call instruction may be implemented, for example, in the processor 106. Receipt of indication of detection a subroutine call, causes the lock control logic 210 to reset at least some of the lock flags 104. For example, the cache blocks 204 may be partitioned for use in loop caching as described above or subroutine caching. Cache blocks 204 dedicated to loop caching are not affected by the detection of a subroutine call, and cache blocks 204 dedicated to subroutine caching are not affected by the detection of an instruction loop branch. Resetting lock flags 104 based on a subroutine call causes the instructions at the start of the subroutine to be stored in the cache blocks 204 in a manner similar to that described for the instruction loop. The instructions at the start of the subroutine may be provided from the instruction cache 102 on subsequent calls.

The interrupt input to the lock control logic 210 indicates that an interrupt service request has been received by the system 100. Detection of an interrupt service request may be implemented in an interrupt controller of the system 100, or in flow control logic of the processor 106 that redirects execution based on receipt of an interrupt service request. Receipt of an interrupt service request that is to be serviced, causes the lock control logic 210 to reset at least some of the lock flags 104. For example, the cache blocks 204 may be partitioned for use in loop caching as described above or for caching of instructions of an interrupt service routine. Cache blocks 204 dedicated to loop caching are not affected by the detection of an interrupt service request, and cache blocks 204 dedicated to caching an interrupt service request are not affected by the detection of an instruction loop branch. Resetting lock flags 104 based on an interrupt service request causes the instructions at the start of the interrupt service routine executed to service the interrupt request to be stored in the cache blocks 204 in a manner similar to that described for the instruction loop. The instructions at the start of the interrupt service routine may be provided from the instruction cache 102 on subsequent interrupt service requests.

FIGS. 3-4 illustrate operation of the instruction cache 102 in accordance with various embodiments. FIG. 3 illustrates storage of instructions of an instruction loop 302 in the instruction cache 102. The instruction loop 302 includes instructions stored in the instruction memory 108 starting at instruction 304 through the loop branch instruction 312. The first iteration of the loop 302 is retrieved and executed from the instruction memory 108. In embodiments of the instruction cache 102 that disable writing to the cache blocks 104 after initialization, during the first iteration, the instructions of the loop are not written to the cache 102 because the lock flags 104 are set to disable writing to the cache blocks 204. At the end of the first iteration, the loop branch instruction 312 is identified and the lock flags 104 are reset to enable writing to the cache blocks 204. At the start of the second iteration of the loop 302, as the instructions 304, 306, 308, and 310 are fetched from instruction memory 108, the instructions 304-310 are stored in the cache blocks 204, and lock flags 104 corresponding to the written cache blocks 204 are set to disable cache writes. In other embodiments of the instruction cache 102 the writing to the cache blocks 104 may be enabled after initialization and therefore the instructions 304-310 may be stored to the cache blocks 104 in the first iteration. On the subsequent iterations of the loop 302, the instructions 304-310, illustrated as cached instructions 314, are provided from the instruction cache 102 rather than retrieved from instruction memory 108. Thus, the instruction cache 102 may accelerate loop execution while reducing or eliminating power waste due to thrashing.

FIG. 4 illustrates operation of the instruction cache 102 with nested loops. An instruction loop 402 stored in instruction memory 108 includes a nested loop 404. The loop 402 starts at instruction 416 and extends through the loop branch instruction 418. The nested loop 404 starts at instruction 406 and extends though loop branch instruction 414. On initiation of the loop 402, the lock flags 104 are set. When loop branch instruction 414 is detected, the lock flags 104 are reset, and the instructions 406, 408, 410, and 412 of the inner loop 404 are fetched from instruction memory 108 and stored in the cache blocks 204. Writing of each cache block 204 causes the lock flag 104 associated with the written cache block 204 to be set. On subsequent iterations of the loop 404, the instructions 406-412, illustrated as cached instructions 420, are provided from the instruction cache 102 rather than retrieved from instruction memory 102.

After finishing the inner loop 404 and detection of the loop branch instruction 418 for the outer loop 402, the lock flags 104 are reset. Thereafter, the first instructions of the outer loop starting from instruction 416 are stored in the cache blocks 204 and the associated lock flags 104 are set. In this example, in the first iteration of the inner loop (during the second iteration of the outer loop) the instruction 406 is still in a cache block causing a cache hit, but the inner loop instructions 408, 410 and 412 are not in the cache blocks (cache misses) and are not stored in the cache blocks 204 due to the set lock flags 104. However, the detection of the loop branch instruction 414 of the inner loop causes the lock flags to be reset and subsequently instructions 408, 410 and 412 are again stored in the cache blocks 204. Thus, the cache 102 tends to primarily store inner loop instructions (only disturbed for a short time by the outer loop when the inner loop is exited), which results in nearly optimal application of the available instruction cache size for nested loops without any additional control logic.

Figure 5:
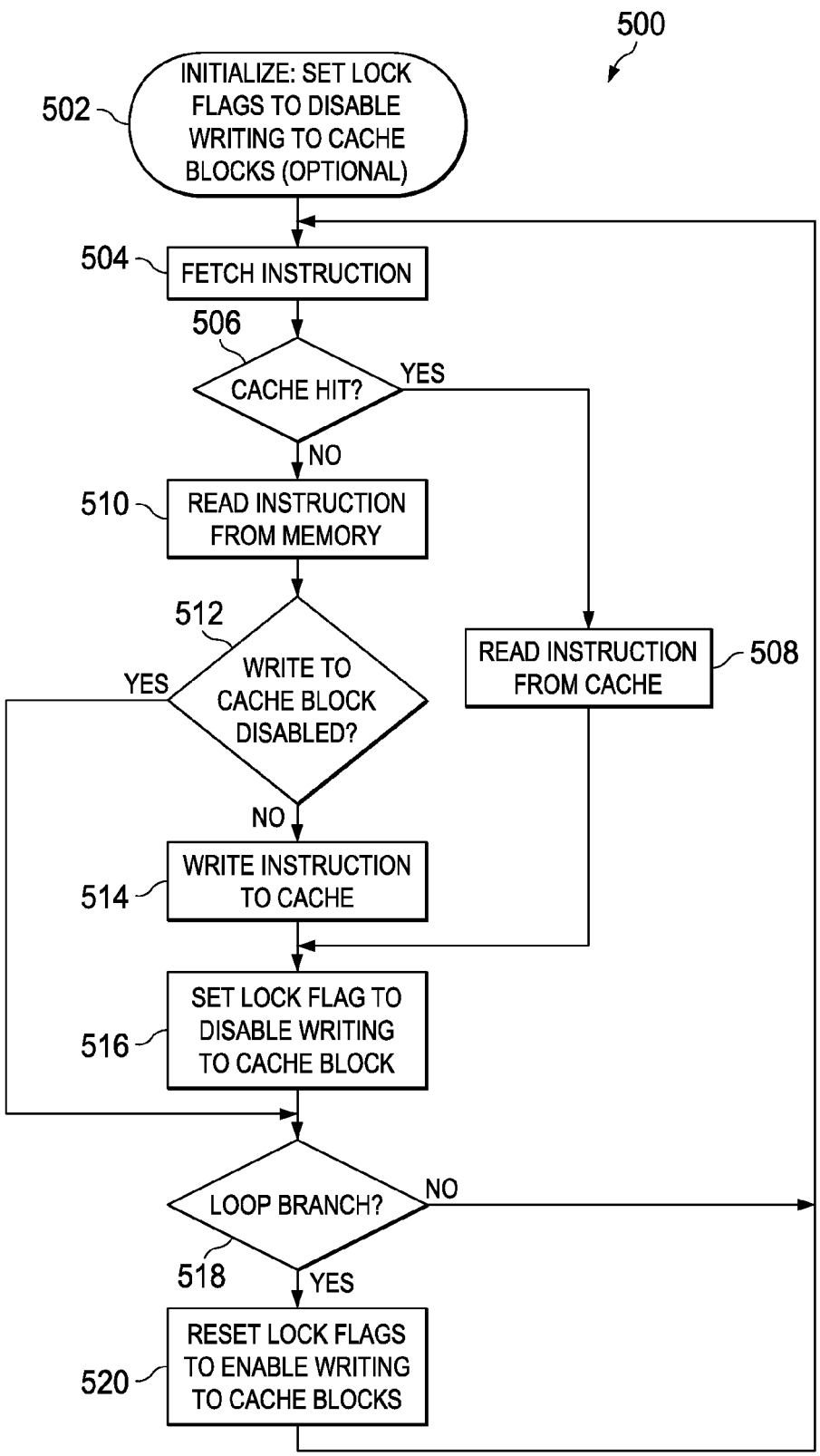
FIG. 5 shows a flow diagram for a method for caching instructions in accordance with various embodiments.

FIG. 5 shows a flow diagram for a method for caching instructions in accordance with various embodiments. Though depicted sequentially as a matter of convenience, at least some of the actions shown can be performed in a different order and/or performed in parallel. Additionally, some embodiments may perform only some of the actions shown.

In block 502, the system 100 is initialized. For example, a reset signal asserted when the system 100 is powered on, or at another time initialization is desired, may cause the components of the system 100 to transition to an initial state. The instruction cache 102 is initialized by setting the lock flags 104 to a state that disables writing of instructions to the cache blocks 204, and by setting the valid flags 208 to a state that indicates the cache blocks 204 have not been written. The instruction cache 102 may also be initialized in isolation from other components of the system 100.

In block 504, the fetch unit 106 is fetching instructions for execution. Instructions may be provided to the fetch unit 106 from the instruction memory 108 or the instruction cache 102.

In block 506, the instruction cache 102 receives the address of an instruction to be fetched and determines whether the instruction being addressed is stored in the instruction cache 102. If the addressed instruction is stored in the instruction cache 102, then the instruction is read from the instruction cache 102, in block 508, and provided to the fetch unit 102. Reading an instruction from the instruction cache 102 may set the lock flag 104 corresponding to the cache block 204 from which the instruction is read to disable writing to the cache block 204 in block 516.

If, in block 506, the addressed instruction is determined to not be stored in the instruction cache 102, then the instruction is read from the instruction memory 108 in block 510.

In block 512, the instruction cache 102 determines whether writing to a cache block 204 associated with the address of the instruction fetched is enabled or disabled. The lock flag 104 corresponding to the cache block 204 indicates whether writing is enabled or disabled. If the lock flag 104 indicates that writing of the cache block 204 is disabled, then the instruction is not stored in the instruction cache 102.

If the lock flag 104 indicates that writing of the cache block 204 is enabled, then the instruction is written to the cache block 204 in block 514.

In block 516, the lock flag 104 corresponding to the cache block 204 in which the addressed instruction is written is set to disable writing to the cache block 204. Thereafter, the instruction stored in the cache block 204 will not be overwritten until the corresponding lock flag 104 is reset to enable writing (e.g., by execution of a loop branch instruction).

In block 518, the system 100 determines whether the instruction fetched is a loop branch instruction. If the instruction is a loop branch instruction, then, in block 520, the instruction cache 102 resets the lock flags 104 to permit writing to the cache blocks 204. Fetching of instructions to be executed continues in block 504.

The operations of the method 500 are directed to caching instructions of an instruction loop. Similar operations may be performed if a subroutine call instruction, rather than a loop branch instruction, is executed, or if an interrupt service request is received.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A system, comprising:
a processor configured to fetch instructions for execution; and
an instruction cache configured to store instructions for execution, the instruction cache comprising:
instruction storage comprising a plurality of cache blocks to store the instructions;

a plurality of lock indicators, each of the lock indicators assigned to control access to one of the cache blocks; and control logic configured to:
- responsive to access of a given one of the cache blocks, set to a write disable state a given one of the lock indicators assigned to control access to the given one of the cache blocks, wherein the access of the given one of the cache blocks comprises a write of an instruction to the given one of the cache blocks or a read of an instruction from the given one of the cache blocks; and
- on determination that a given instruction fetched by the processor is not stored in the instruction storage, deny write access to the given one of the cache blocks based on the given one of the lock indicators being set to the write disable state, wherein the given one of the cache blocks is associated with the given instruction.

2. The system of claim 1, wherein the control logic is configured to set each of the plurality of lock indicators to the write disable state as part of initialization of the instruction cache.

3. The system of claim 2, wherein the control logic is configured to allow the given instruction to be written to the given one of the cache blocks only if the given one of the lock indicators is reset to a write enable state.

4. The system of claim 1, wherein the control logic is configured to allow only instructions that are part of an instruction loop to be stored in the instruction storage.

5. The system of claim 1, wherein the control logic is configured to reset all of the lock indicators to a write enable state based on execution of a loop branch instruction by the processor.

6. The system of claim 1, wherein the control logic is configured to reset at least a portion of the lock indicators to a write enable state based on recognition, by the processor, of an interrupt service request.

7. The system of claim 1, wherein the control logic is configured to reset at least a portion of the lock indicators to a write enable state based on recognition of execution of a subroutine call by the processor.

8. An instruction cache, comprising:
- instruction storage, comprising a plurality of cache blocks to store instructions;
- a plurality of lock indicators, each of the lock indicators associated with one of the cache blocks so as to control access to the associated cache block; and
- control logic configured to:
  - set to a write disable state, responsive to access of a given one of the cache blocks, a given one of the lock indictors associated with the given one of the cache blocks, wherein the access of the given one of the cache blocks comprises a write of an instruction to the given one of the cache blocks or a read of an instruction from the given one of the cache blocks;
  - determine whether a given instruction is stored in the instruction storage; and
  - deny write access to the given one of the cache blocks that is assigned to store the given instruction based on the given one of the lock indicators being set to the write disable state.

9. The instruction cache of claim 8, wherein the control logic is configured to set each lock indicator to the write disable state as part of initialization of the instruction cache.

10. The instruction cache of claim 9, wherein the control logic is configured to allow the given instruction to be written to the given one of the cache blocks only if the given one of the lock indicators is reset to a write enable state.

11. The instruction cache of claim 8, wherein the control logic is configured to allow only instructions that are part of an instruction loop to be stored in the instruction storage.

12. The instruction cache of claim 8, wherein the control logic is configured to reset all of the lock indicators to a write enable state based on execution of a loop branch instruction by a device containing the instruction cache.

13. The instruction cache of claim 8, wherein the control logic is configured to reset at least a portion of the lock indicators to a write enable state based on receipt of an interrupt service request by a device containing the instruction cache.

14. The instruction cache of claim 8, wherein the control logic is configured to reset at least a portion of the lock indicators to a write enable state based on execution of a subroutine call by a device containing the instruction cache.

15. A method, comprising:
- fetching, by a processor, instructions for execution;
- storing the instructions in cache blocks of an instruction cache;
- controlling access to the cache blocks via lock indicators, wherein each of the lock indicators controls access to one of the cache blocks;
- setting to a write disable state, responsive to access of a given one of the cache blocks, a given one of the lock indictors associated with the given one of the cache blocks, wherein the access of the given one of the cache blocks comprises a write of an instruction to the given one of the cache blocks or a read of an instruction from the given one of the cache blocks;
- determining whether a given instruction is stored in the instruction cache;
- denying write access to the given one of the cache blocks that is assigned to store the given instruction based on the given one of the lock indicators being set to the write disable state.

16. The method of claim 15, further comprising setting each of the plurality of lock indicators to the write disable state as part of initialization of the instruction cache.

17. The method of claim 15, further comprising writing the given instruction to the given one of the cache blocks only if the given one of the lock indicators is reset to a write enable state.

18. The method of claim 15, further comprising storing only instructions that are part of an instruction loop in the instruction cache.

19. The method of claim 15, further comprising resetting all of the lock indicators to a write enable state based on execution of a loop branch instruction.

20. The method of claim 15, further comprising resetting at least a portion of the lock indicators to a write enable state based on receipt of an interrupt service request or execution of a subroutine call.

* * * * *